United States Patent

Goswami et al.

Patent Number: 5,693,589
Date of Patent: Dec. 2, 1997

[54] THERMAL IMAGING RECORDING ELEMENT

[75] Inventors: Ramanuj Goswami, Webster; Robert J. Perry, Niskayuna; Paul Anthony Zielinski, Rochester, all of N.Y.

[73] Assignee: Eastman Kodak Company, Rochester, N.Y.

[21] Appl. No.: 646,672

[22] Filed: May 8, 1996

[51] Int. Cl.$^6$ .............................. G03C 1/73; G03C 7/02; G01D 15/10
[52] U.S. Cl. ................ 503/227; 430/200; 430/201; 430/334; 430/339; 430/343; 430/964; 346/76 PH
[58] Field of Search ........................ 430/200, 201, 430/334, 339, 343, 964; 503/227; 346/76 PH

[56] References Cited

U.S. PATENT DOCUMENTS

| | | | |
|---|---|---|---|
| 3,585,038 | 6/1971 | Cescon et al. | 430/343 |
| 3,734,732 | 5/1973 | Poot et al. | 430/495 |
| 4,196,002 | 4/1980 | Levinson et al. | 430/617 |
| 4,201,590 | 5/1980 | Levinson et al. | 430/617 |
| 4,894,358 | 1/1990 | Filosa et al. | 503/201 |
| 5,399,459 | 3/1995 | Simpson et al. | 430/270 |

OTHER PUBLICATIONS

USSN 08/583,395, Perry et al.
USSN 646,669 (Docket 73696) of Goswami et al, entitled "Thermal Recording Element".

*Primary Examiner*—Richard L. Schilling
*Attorney, Agent, or Firm*—Harold E. Cole

[57] ABSTRACT

A thermal recording element comprising a support having thereon a dye layer comprising a polymeric binder containing:

(a) a metallized complex of a formazan dye that absorbs at from about 400 to about 850 nm; and
(b) an organic carboxylic acid;

the dye layer having associated therewith:

(c) a hexaarylbiimidazole which is an oxidative dimer of a 2,4,5-triarylimidazole having one of the following formulas:

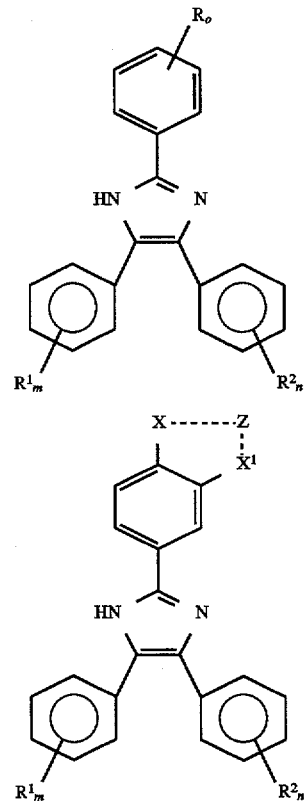

wherein:

R, $R^1$ and $R^2$ each independently represents hydrogen, a substituted or unsubstituted alkyl or alkoxy group of from 1 to about 12 carbon atoms, amino, a substituted or unsubstituted cycloalkyl group having from about 5 to about 7 carbon atoms, or an electron-rich heterocyclic group having from about 5 to about 7 atoms, with the proviso that at least one of R and $R^1$ is the alkoxy or amino group;

X and $X^1$ each independently represents oxy or imino;

Z is an alkylene group of 1 or 2 carbon atoms; and m, n and o each independently represents an integer of 0 to 5.

9 Claims, No Drawings

THERMAL IMAGING RECORDING ELEMENT

This invention relates to a thermal recording element, and more particularly to a thermal recording element containing a metallized complex of a formazan dye, a hexaarylbiimidazole and an acid which is used in a thermal dye-bleaching process to form a monochrome image.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to one of a cyan, magenta or yellow signal. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

U.S. Ser. No. 08/583,395 relates to an antihalation composition and a photothermographic element containing such composition in or on a support. The antihalation composition is described as comprising a formazan dye and a hexaarylbiimidazole. There is no disclosure in that application, however, that such a composition would be useful in a thermal recording element for a thermal dye-bleaching process.

U.S. Pat. No. 5,399,459 relates to image formation with thermally bleachable dyes. However, this imaging process involves imagewise dye removal or dye ablation from an element, and not simple bleaching of a dye on a substrate.

U.S. Pat. No. 4,894,358 relates to image formation by bleaching of certain bridged triarylmethane dyes. However, the dye composition employed in the present invention is not disclosed.

U.S. Ser. No. 08/646,669 Goswami et al., entitled "Thermal Recording Element", filed May 8, 1996 relates to thermal recording elements comprising a formazan dye and a hexaarylbiimidazole used in a thermal dye-bleaching process to form a monochrome image. Metallized formazan dyes are not disclosed in this application, however.

It is an object of this invention to provide a thermal recording element comprising a dye layer containing materials which will form a monochrome image upon heating with a thermal head.

This and other objects are achieved in accordance with the invention which comprises a thermal recording element comprising a support having thereon a dye layer comprising a polymeric binder containing:

(a) a metallized complex of a formazan dye that absorbs at from about 400 to about 850 nm; and (b) an organic carboxylic acid;

the dye layer having associated therewith, either in the dye layer or an adjacent layer:

(c) a hexaarylbiimidazole which is an oxidative dimer of a 2,4,5-triarylimidazole having one of the following formulas:

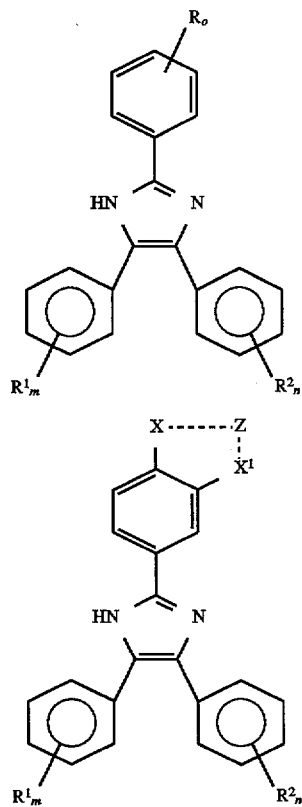

wherein:

R, $R^1$ and $R^2$ each independently represents hydrogen, a substituted or unsubstituted alkyl or alkoxy group of from 1 to about 12 carbon atoms, amino, a substituted or unsubstituted cycloalkyl group having from about 5 to about 7 carbon atoms, or an electron-rich heterocyclic group having from about 5 to about 7 atoms, with the proviso that at least one of R and $R^1$ is the alkoxy or amino group;

X and $X^1$ each independently represents oxy or imino;

Z is an alkylene group of 1 or 2 carbon atoms; and m, n and o each independently represents an integer of 0 to 5.

In the above formulas, R, $R^1$ and $R^2$ can represent hydrogen; a substituted or unsubstituted alkyl group of 1 to 12 carbon atoms such as substituted or unsubstituted methyl, ethyl, n-propyl, isopropyl, i-butyl, t-butyl, hexyl, dodecyl, benzyl or neopentyl; a substituted or unsubstituted alkoxy group of 1 to 12 carbon atoms such as substituted or unsubstituted methoxy, ethoxy, 1-propoxy, benzyloxy, ethyleneoxy or dodecyloxy; amino (primary, secondary or tertiary having one or more alkyl groups as defined above); a substituted or unsubstituted cycloalkyl group having 5 to 7 carbon atoms such as substituted or unsubstituted cyclopentyl, cyclohexyl or cycloheptyl; or an electron-rich substituted or unsubstituted heterocyclic group having 5 to 7 atoms (carbon, oxygen, sulfur and nitrogen) in the central ring, such as substituted or unsubstituted furanyl, thiophenyl, pyridyl or pyrrolyl. Other heterocyclic rings would be readily apparent to a skilled artisan.

In a preferred embodiment of the invention, R is an alkoxy group of from 1 to about 8 carbon atoms and o is 1 to 3. In another preferred embodiment, $R^1$ and $R^2$ each independently represents a substituted or unsubstituted alkyl or alkoxy group of from 1 to about 4 carbon atoms, m and n are each 0 or 1, at least one of X and $X^1$ is oxy, and Z is methylene.

When the compounds have an $R^1$ or $R^2$ substituent, it can be located at any position on the respective phenyl rings. Preferably, the one or more $R^1$ or $R^2$ groups are in the ortho or para positions of the phenyl rings, in relation to the carbon atoms attached to the imidazole ring. Preferably, when one of $R^1$ or $R^2$ is present, it is in the para or 4-position.

In the above formula, X and $X^1$ can be the same or different divalent group. Preferably, at least one of them is oxy, and more preferably, each of X and $X^1$ is oxy. Z is alkylene of 1 or 2 carbon atoms, and can be substituted. Preferably, Z is methylene.

Following are 2,4,5-triarylimidazoles (TAI's) which are used to form the HABI's useful in the invention:

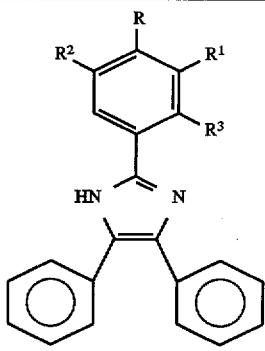

| HABI formed from TAI | R | $R^1$ | $R^2$ | $R^3$ |
|---|---|---|---|---|
| R-1 | $OCH_3$ | H | H | H |
| R-2 | $OCH_3$ | $OCH_3$ | $OCH_3$ | H |
| R-3 | $R-R^1 = -OCH_2O-$ | | H | H |
| R-4 | $OC_4H_9$ | H | H | H |

The following HABI is an example of the oxidative dimer of the TAI described above:

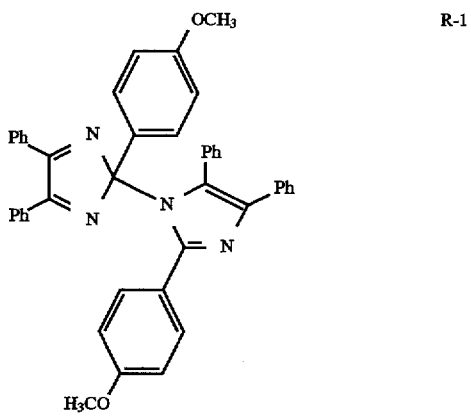

wherein "Ph" is phenyl.

The TAI radicals dimerize to form the HABI under alkaline oxidative reaction conditions.

Other useful hexaarylbiimidazoles are described in U.S. Pat. Nos. 3,383,212; 3,390,994; 3,445,234; 3,533,797; 3,615,481; 3,630,736; 3,666,466 and 3,734,733.

If desired, a combination of hexaarylbiimidazoles of the noted structure can be used. These materials can be readily prepared using known preparatory methods described, for example, in U.S. Pat. Nos. 4,196,002 and 4,201,590 to Levinson et al. and by Hayashi, *Bull. Chem. Soc. Japan,* 33, 565 (1960).

Important teachings relating to hexaarylbiimidazoles have been published by Aldag, *Photochromism, Molecules and Systems,* Durr and Bouras-Laurent (Eds.), Chapter 18, pages 714–717, Elsevier, 1990. A single triarylimidazole can conceivably give rise to different structural dimers in the dimer linkage made via C—N, C—C or N—N bonds. These individual structural dimers or mixtures thereof can be generated chemically, thermally or photolytically from a common triarylimidazolyl radical. While the dimers specifically described therein are linked via a C—N bond (2-carbon atom of one imidazole ring and nitrogen atom of the other imidazole ring), the present invention is not so limited.

The metallized complex of the formazan dyes useful in the present invention absorb at from about 400 to about 850 nm. Preferably, formazan dyes absorbing at from about 500 to about 850 nm are used. Useful formazan dyes are well known in the art, including the Levinson et al. patents cited above, both of which are incorporated herein by reference.

More particularly, useful formazan dyes which form the metallized complex used in the invention can be represented by the structure:

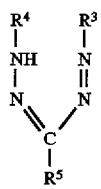

wherein:

$R^3$ is a substituted or unsubstituted aromatic group of 6 to 20 atoms in the ring system, such as a carbocyclic or heterocyclic aromatic ring. Such aromatic groups can be carbocyclic or heterocyclic containing one or more nitrogen, oxygen or sulfur atoms. The aromatic group can be substituted with one or more groups as defined below.

$R^4$ can be a substituted or unsubstituted coordinating aromatic group having from 5 to 15 carbon atoms in the ring system, such as pyridyl, pyrimidyl, oxazyl, benzothiazolyl, benzimidazolyl, etc.

$R^5$ is a substituted or unsubstituted alkyl group of 1 to 20 carbon atoms, such as substituted or unsubstituted methyl, ethyl, n-propyl, isopropyl, t-butyl, hexyl, decyl, benzyl and other branched or linear hydrocarbons readily apparent to one skilled in the art; a substituted or unsubstituted aryl group of 6 to 14 carbon atoms in the ring, such as phenyl, xylyl, tolyl, naphthyl, 4-hydroxyphenyl, p-nitrophenyl, dimethoxyphenyl, anthroquinonyl and other substituted carbocyclic aromatic ring systems readily apparent to one skilled in the art; or a substituted or unsubstituted 5- to 7-membered heterocyclic group having 5 to 7 atoms in the ring nucleus, such as pyridyl, pyrimidyl, oxazolyl, benzothiazolyl, benzimidazolyl, and others readily apparent to one skilled in the art.

Particularly useful formazan dyes from which metallized complexes can be made include the following:

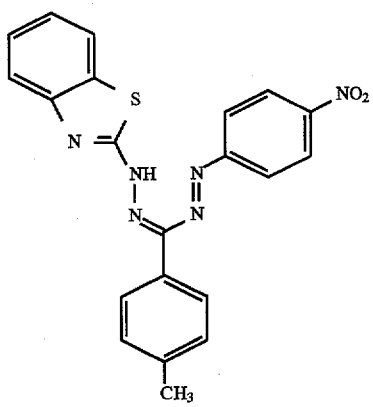
F-1
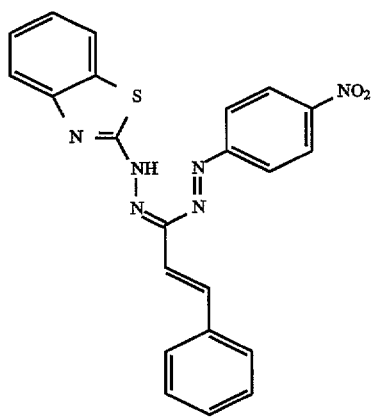
F-2
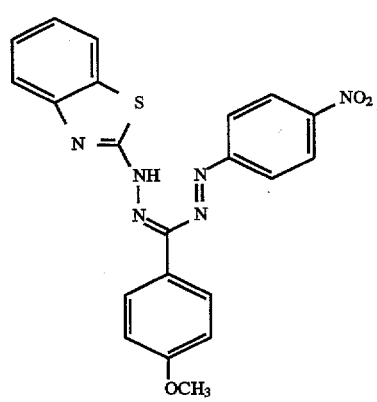
F-3
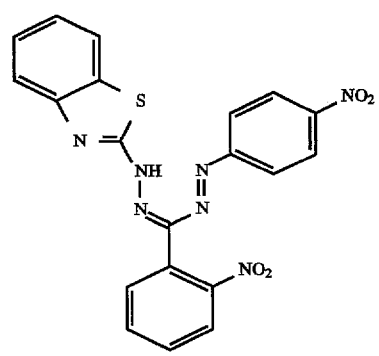
F-4
-continued
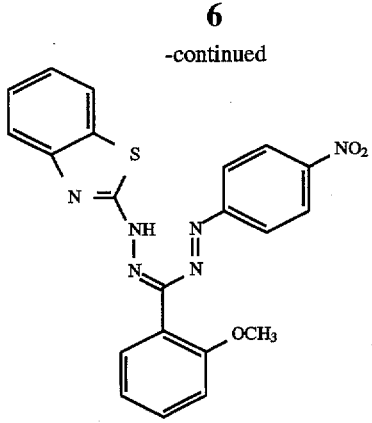
F-5
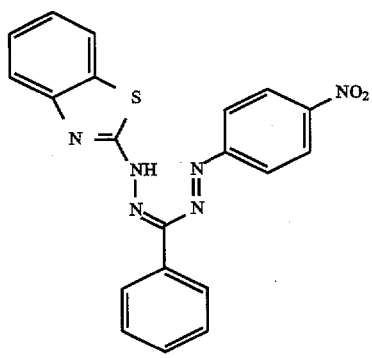
F-6
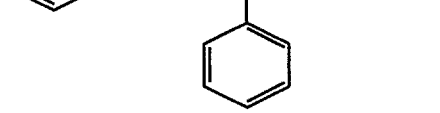
F-7
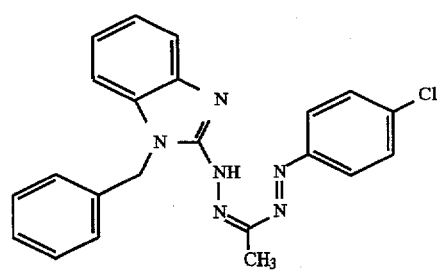
F-8
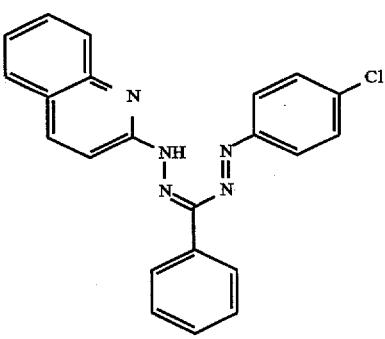
F-9

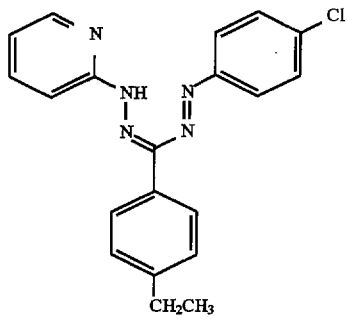

F-10

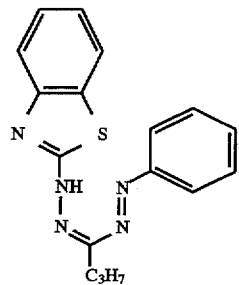

F-11

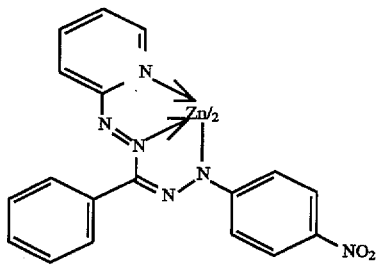

MF-1

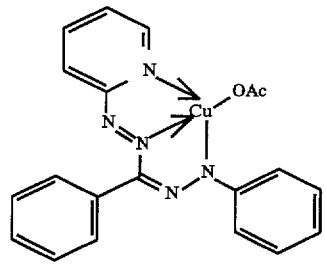

MF-2

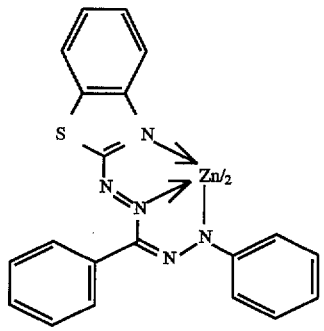

MF-3

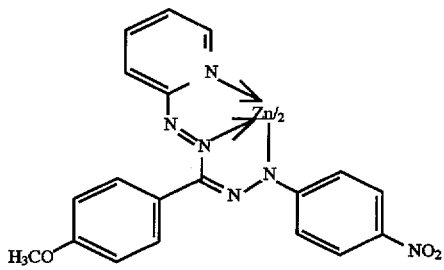

MF-4

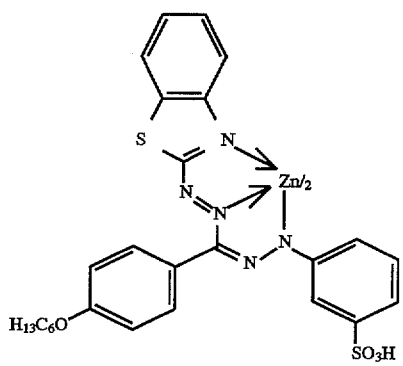

MF-5

A preferred formazan is F-11 wherein $R^3$ is phenyl, $R^4$ is benzothiazole, and $R^5$ is n-propyl.

The preparation of formazan dyes is well known in the art, for example as described by Nineham, *Chem. Reviews*, 55, pp. 355–475 (1955).

Methods of making the metallized formazan dyes used in the invention are well known in the art. The metal complexes can be mono- or multidentate. For example, a formazan dye can be mixed with a suitable metal salt (such as an acetate, sulfate or chloride of a metal such as zinc, copper, cadmium or cobalt) in a suitable solvent to allow complexation to occur. The resulting metallized complex can be isolated from the reaction mixture and then mixed with the hexaarylimidazole as described herein. Alternatively and preferably, the metallized formazan dye complex is formed in situ in the coating from the formazan dye and a suitable metal salt.

Metallized complexes of the formazan dyes useful in the invention have the following general formula:

$$\begin{array}{c} R^4 \diagdown \quad \diagup R^3 \\ N \quad M_{/p} - N \\ \parallel \quad \diagup \\ N \diagdown \quad N \\ C \\ | \\ R^5 \end{array}$$

wherein $R^3$, $R^4$ and $R^5$ are defined as above;

M is a metal ion such as zinc, copper, cadmium, cobalt, etc.; and p is the valence of the metal ion. Any remaining unsatisfied valence of the metal can be filled by other ligands such as an acetate ion. In a preferred embodiment, M is divalent zinc and p is 2.

Specific metallized complexes useful in the invention include the following:

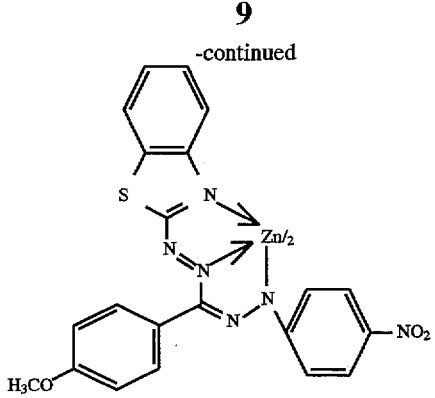

MF-6

A preferred metallized formazan complex is MF-1 wherein $R^3$ is p-nitrophenyl, $R^4$ is pyridyl, $R^5$ is phenyl and M is zinc.

In general, the metal and formazan dye must be chosen such that the binding constant ($K_b$) with the dye is less than or equal to $10^{25}$. In other words, log ($K_b$) must be ≦25. Preferably, log ($K_b$)<21. Zinc is a preferred metal to use with the formazan dyes listed above, and especially with F-1. Binding constants are described by Uchiumi et al. in Anal. Sci., 7, 119–124 (1991).

Generally, the molar ratio of hexaarylbiimidazole to the metallized complex of the formazan dye is from about 1:1 to about 5:1. More preferably, this molar ratio is from about 2:1 to about 3:1.

As mentioned above, an organic carboxylic acid is added to the dye composition used in the invention or mixture of such acids, each having a $pK_a$ of from about 3 to about 6. Preferably, the $pK_a$ is from about 4.5 to about 5.5. Useful acids include, but are not limited to, p-propoxybenzoic acid, o-, p- or m-anisic acid, palmitic acid, 2-chlorobenzoic acid, 1-naphthoic acid, and 4-propylbenzoic acid. A preferred carboxylic acid is o-anisic acid. The acid promotes more efficient bleaching by an unknown mechanism. The acid may be added in an mount of from about 0.1 to about 1.0 g/m².

As noted above, the thermal recording element of the invention is used to form a dye image. Such a process comprises imagewise heating the thermal recording element, such as by using a thermal head, to form the image by bleaching the dye. This process of forming an image is known as bleaching and forms a monochrome image.

Thermal printing heads which can be used to form the dye image by the invention are available commercially. There can be employed, for example, a Fujitsu Thermal Head (FTP-040 MCS001), a TDK Thermal Head F415 HH7-1089 or a Rohm Thermal Head KE 2008-F3. Alternatively, other known sources of energy for thermal dye transfer may be used such as lasers. If a laser is used, then an infrared-absorbing material must also be used in the recording element, The following examples are provided to further illustrate the invention.

EXAMPLE 1

A) A reflective thermal recording element was prepared by coating a subbing layer of a mixture of an amino-functional organo-oxysilane Prosil 221® with a hydrophobic organo-oxysilane, Prosil 2210®, which is an epoxy-terminated organo-oxysilane, onto a support of Oppalyte® polypropylene-laminated paper support with a lightly $TiO_2$-pigmented polypropylene skin (Mobil Chemical Co.) at a dry coverage of 0.11 g/m². Prior to coating, the support was subjected to a corona discharge treatment at approximately 450 joules/m². The subbed element was then coated using a 125 μm doctor blade and a mixture of 0.010 g of dye MF-6, 2 molar equivalents of HABI R-1 based on the dye, dissolved in 10 g of a 6 wt % solution of poly(vinyl butyral) Butvar 76® (Monsanto Chem. Co.) in acetone.

B) This example was prepared the same as A) except that it also contained 10 molar equivalents of o-anisic acid.

C) This example was prepared the same as A) except that the dye was F-3 and the dye layer composition also contained 0.5 molar equivalents of $Zn(OAc)_2 \cdot 2H_2O$.

D) This example was prepared the same as C) except that it also contained 10 molar equivalents of o-anisic acid.

After coating, the elements were allowed to dry for 2 min. at 50° C.

A protective cover sheet was prepared by coating on a 6 μm poly(ethylene terephthalate) support a slipping layer of poly(vinyl acetal) (Sekisui Co.) (0.383 g/m²), candelilla wax (0.0215 g/m²), p-toluenesulfonic acid (0.0003 g/m²), and an aminopropyl dimethyl-terminated polydimethylsiloxane, PS513 (Petrarch Systems, Inc.) (0.0108 g/m²).

Printing Conditions

The protective cover sheet was placed on top of the thermal recording element, with the slipping layer outermost. This sandwich was then fastened to the top of the motor driven 53 mm diameter rubber roller and a TDK thermal head L-231, thermostated at 24° C. with a head load of 2 kg pressed against the rubber roller. The TDK L-231 thermal print head has 512 independently addressable heaters with a resolution of 5.4 dots/mm and an active printing width of 95 mm, of average heater resistance 512Ω. The imaging electronics were activated and the element was drawn between the printing head and roller at 20.6 mm/s. Coincidentally, the resistive elements in the thermal print head were pulsed on for 128 μs every 130 μs. The printing was performed at 12.5V and 17 ms line time. This translated to an instantaneous power of 0.316 watts/dot and a maximum total printing energy of 5.14 mJ/dot.

The printed image consisted of small squares, each printed at a uniform, but different, energy. The Status A reflection density was then obtained on an X-Rite 338 densitometer (X-Rite Corp., Grandville, Mich.) on the recording elements before and after printing. A reading was also made on the blank support for comparison.

TABLE 1

| | | STATUS A REFLECTION DENSITY | | | | | |
|---|---|---|---|---|---|---|---|
| | | Before Printing | | | After Printing | | |
| Example | Acid | C | M | Y | C | M | Y |
| A* | No | 0.75 | 0.32 | 0.36 | 0.72 | 0.37 | 0.36 |
| B* | Yes | 0.74 | 0.41 | 0.42 | 0.21 | 0.17 | 0.20 |
| C** | No | 0.85 | 0.36 | 0.40 | 0.57 | 0.29 | 0.31 |
| D** | Yes | 0.77 | 0.39 | 0.41 | 0.19 | 0.15 | 0.21 |
| blank | | 0.09 | 0.11 | 0.09 | 0.09 | 0.11 | 0.09 |

*Preformed metal complex
**Metal complex formed in situ

The above results show that the acid provides more complete bleaching (density decrease) of the dye.

EXAMPLE 2

E–I) A transmissive thermal recording element was prepared by coating with a 125 μm doctor blade onto a 125

μm poly(ethylene terephthalate) support, a subbing layer of poly(acrylonitrile-co-vinylidene chloride-co-acrylic acid) (14:79:7 wt. ratio) (0.08 g/m²) and then a mixture of dye F-3 (0.010 g), various amounts of HABI R-1 as shown in Table 2 below, 10 g. of a 6 wt % solution of poly(vinyl butyral) Butvar 76® (Monsanto Chem. Co.) in acetone, 0.005 g of Zn(OAc)$_2$.2H$_2$O, and 0.018 g of o-anisic acid. The amount of HABI is expressed in terms of molar equivalents of the dye. The coating was allowed to dry for 2 min. at 50° C.

The samples were printed as in Example 1 and the transmission density measured. The following results were obtained:

TABLE 2

| Example | Molar Eq. of HABI | STATUS A TRANSMISSION DENSITY | | | | | |
|---|---|---|---|---|---|---|---|
| | | Before Printing | | | After Printing | | |
| | | R | G | B | R | G | B |
| E | 1 | 0.28 | 0.11 | 0.12 | 0.18 | 0.07 | 0.10 |
| F | 2 | 0.25 | 0.09 | 0.11 | 0.11 | 0.05 | 0.08 |
| G | 3 | 0.20 | 0.09 | 0.11 | 0.05 | 0.04 | 0.07 |
| H | 4 | 0.20 | 0.08 | 0.11 | 0.05 | 0.04 | 0.07 |
| I | 5 | 0.19 | 0.07 | 0.10 | 0.05 | 0.03 | 0.07 |
| blank | | 0.02 | 0.02 | 0.02 | 0.02 | 0.02 | 0.02 |

The above results show that higher mounts of HABI resulted in better bleaching (reduced dye density).

EXAMPLE 3

J) The subbed element of Example 1 was coated with a mixture of 0.030 g of dye F-3, 0.181 g of HABI R-1, 10 g of a 6 wt % solution of poly(vinyl butyral) Butvar 76® (Monsanto Chem. Co.) in acetone, 0.008 g Zn(OAc)$_2$.2H$_2$O, and 0.052 g of o-anisic acid.

K) This example was the same as J) except that the dye was F-11, the amount of HABI was 0.092 g, the amount of Zn(OAc)$_2$.2H$_2$O was 0.010 g, and the amount of o-anisic acid was 0.035 g.

L) This example was the same as J) except that the dye was MF-1, the amount of HABI was 0.105 g, and the amount of o-anisic acid was 0.030 g.

The printing conditions were the same as in Example 1 except that the printing voltage was 13.5 v. The following results were obtained:

TABLE 3

| Ex. | STATUS A REFLECTION DENSITY | | | | | | | | |
|---|---|---|---|---|---|---|---|---|---|
| | Before Printing | | | After Printing | | | % Bleaching | | |
| | C | M | Y | C | M | Y | C | M | Y |
| J* | 0.86 | 0.51 | 0.63 | 0.22 | 0.19 | 0.33 | 84 | 80 | 56 |
| K* | 0.54 | 0.73 | 0.93 | 0.07 | 0.11 | 0.15 | 100 | 100 | 93 |
| L** | 1.61 | 0.86 | 0.77 | 0.14 | 0.15 | 0.21 | 97 | 95 | 82 |
| blank | 0.10 | 0.11 | 0.09 | 0.10 | 0.11 | 0.09 | | | |

*Metal complex formed in situ
**Preformed metal complex

The above results show that good bleaching is obtained with a variety of metallized dyes, with example K being exceptionally good.

EXAMPLE 4

Example 2 was repeated except that two molar equivalents of various HABI's as shown in Table 4 were used along with 0.020 g of dye F-3, the Zn(OAc)$_2$.2H$_2$O used was 0.5 molar equivalent, the o-anisic acid used was 10 molar equivalents, based on the amount of the dye, and the printing voltage was 13.0 V.

Following are HABI comparisons, not within the scope of the invention, used in this experiment:

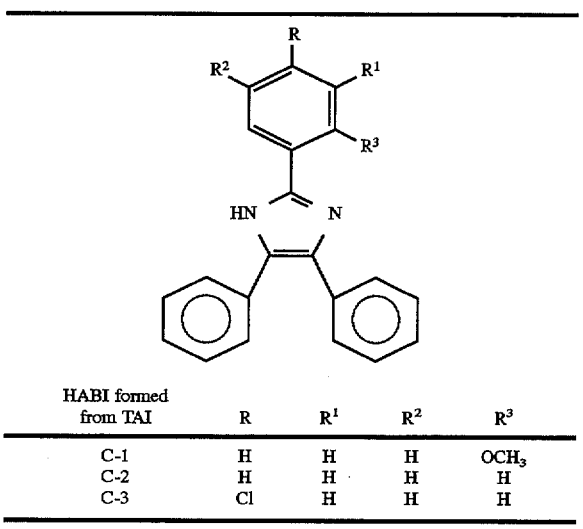

| HABI formed from TAI | R | R¹ | R² | R³ |
|---|---|---|---|---|
| C-1 | H | H | H | OCH₃ |
| C-2 | H | H | H | H |
| C-3 | Cl | H | H | H |

The following results were obtained:

TABLE 4

| HABI | STATUS A TRANSMISSION DENSITY | | | | | |
|---|---|---|---|---|---|---|
| | Before Printing | | | After Printing | | |
| | R | G | B | R | G | B |
| R-1 | 0.19 | 0.08 | 0.09 | 0.10 | 0.07 | 0.10 |
| R-2 | 0.20 | 0.13 | 0.19 | 0.13 | 0.10 | 0.17 |
| R-3 | 0.15 | 0.07 | 0.08 | 0.07 | 0.04 | 0.07 |
| R-4 | 0.17 | 0.07 | 0.07 | 0.10 | 0.06 | 0.08 |
| C-1 | 0.21 | 0.09 | 0.08 | 0.24 | 0.12 | 0.12 |
| C-2 | 0.22 | 0.11 | 0.11 | 0.24 | 0.13 | 0.14 |
| C-3 | 0.24 | 0.11 | 0.10 | 0.25 | 0.13 | 0.13 |
| Blank | 0.02 | 0.02 | 0.02 | 0.02 | 0.02 | 0.02 |

The above results show that only the HABI's according to the invention provided good bleaching to function in a thermal recording dement. The comparison HABI's showed very little bleaching.

The invention has been described in detail with particular reference to preferred embodiments thereof, but it will be understood that variations and modifications can be effected within the spirit and scope of the invention.

What is claimed is:

1. A process of forming a dye image comprising: imagewise-heating a thermal recording element by using a thermal printing head, said thermal recording element comprising a support having thereon a dye layer comprising a polymeric binder containing:

(a) a metallized complex of a formazan dye that absorbs at from about 400 to about 850 nm; and (b) an organic carboxylic acid;

said dye layer having associated therewith:

(c) a hexaarylbiimidazole which is an oxidative dimer of a 2,4,5-triarylimidazole having one of the following formulas:

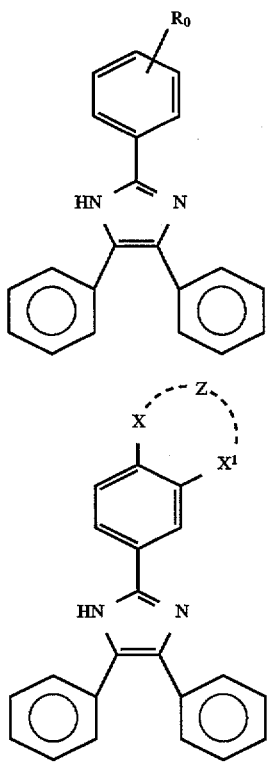

wherein:

R represents an alkoxy group of from 1 to about 12 carbon atoms;

X and $X^1$ each independently represents oxy or imino;

Z is an alkylene group of 1 or 2 carbon atoms; and o represents an integer of 1 or 3, with the proviso that when o is 1, then R is in the para position and when o is 3, then R is in the para and both meta positions;

thereby forming said image.

2. The process of claim 1 wherein the molar ratio of said hexaarylbiimidazole to said formazan dye is from about 1:1 to about 5:1.

3. The process of claim 1 wherein R is an alkoxy group of from 1 to about 8 carbon atoms.

4. The process of claim 1 wherein said organic carboxylic acid is o-anisic acid.

5. The process of claim 1 wherein said formazan dye has the structure:

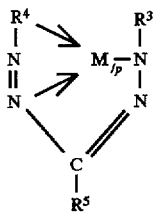

wherein:

$R^3$ is a substituted or unsubstituted aromatic group of from about 6 to about 20 atoms;

$R^4$ is a substituted or unsubstituted aryl group having from about 6 to about 14 carbon atoms or a heterocyclic group having from about 6 to about 14 atoms; and $R^5$ is a substituted or unsubstituted alkyl group of from 1 to about 20 carbon atoms, a substituted or unsubstituted aryl group of from about 6 to about 14 carbon atoms, or a substituted or unsubstituted heterocyclic ring having from about 5 to about 7 atoms.

6. The process of claim 5 wherein $R^3$ is phenyl, $R^4$ is benzothiazole and $R^5$ is n-propyl and the metal used to form said metal complex is either zinc or copper.

7. The process of claim 1 wherein said metallized complex of a formazan dye has the formula:

wherein:

$R^3$ is a substituted or unsubstituted aromatic group of from about 6 to about 20 atoms;

$R^4$ is a substituted or unsubstituted coordinating aromatic group having from about 5 to about 15 atoms; and $R^5$ is a substituted or unsubstituted alkyl group of from 1 to about 20 carbon atoms, a substituted or unsubstituted aryl group of from about 6 to about 14 carbon atoms, or a substituted or unsubstituted heterocyclic ring having from about 5 to about 7 atoms;

M is a metal ion; and p is the valence of said metal ion.

8. The process of claim 7 wherein M is divalent zinc and p is 2.

9. The process of claim 7 wherein $R^3$ is p-nitrophenyl, $R^4$ is pyridyl, $R^5$ is phenyl and M is divalent zinc and p is 2.

* * * * *